Feb. 12, 1952     A. PELTO     2,585,494
FISH LURE
Filed Aug. 6, 1948
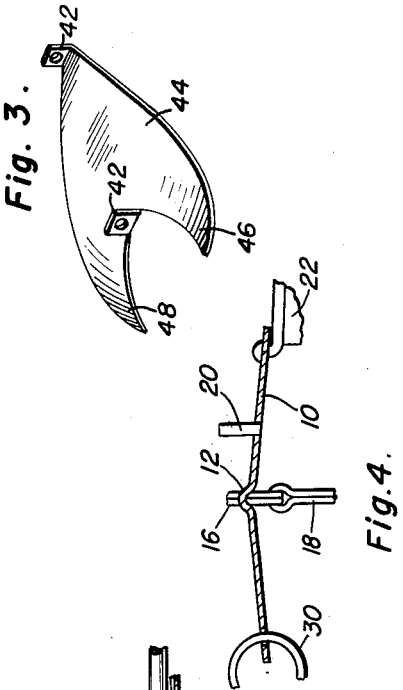
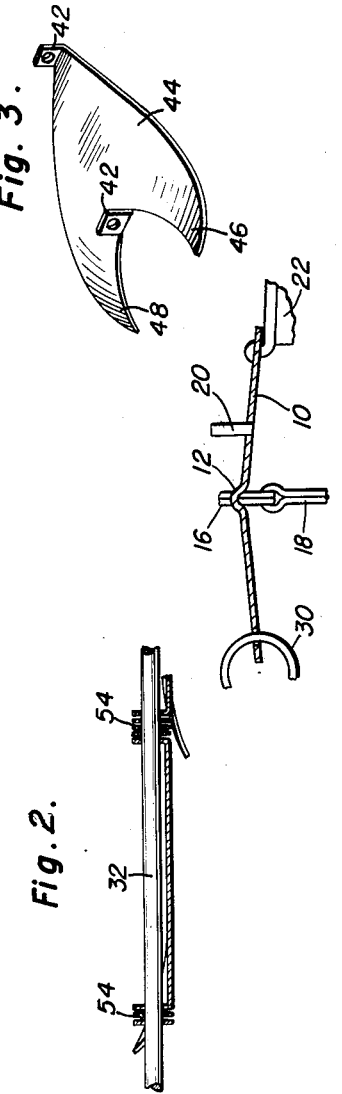
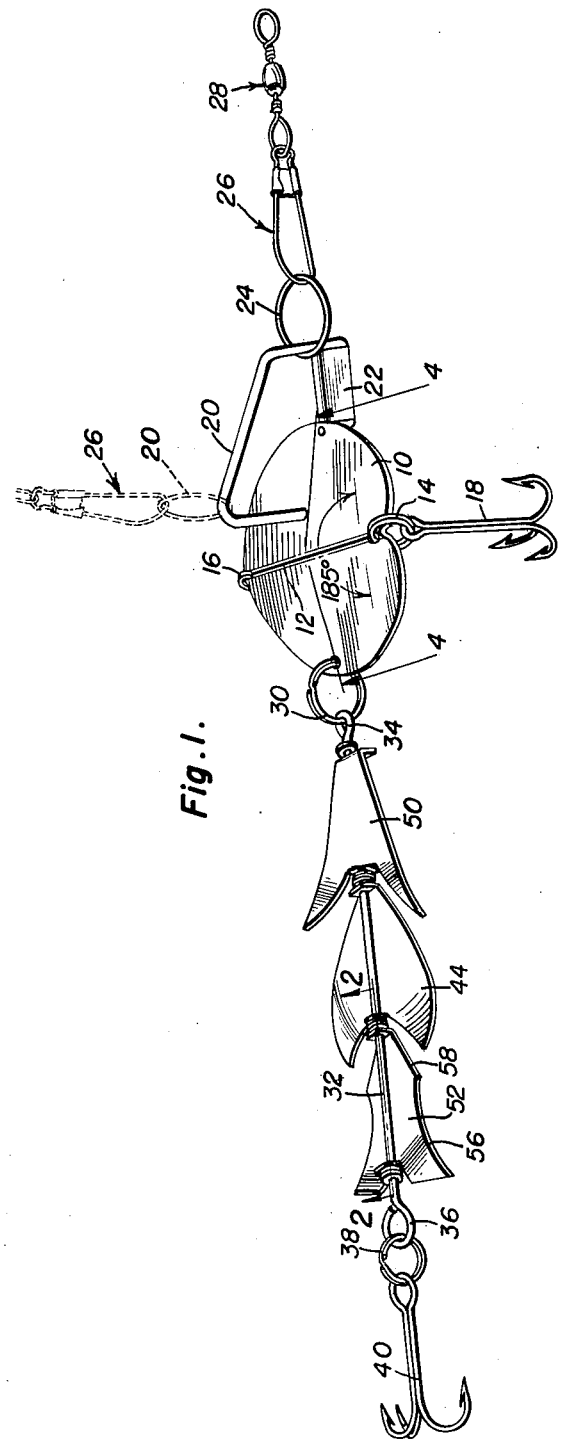
Aade Pelto
INVENTOR.

UNITED STATES PATENT OFFICE 2,585,494

FISH LURE

Aade Pelto, Aurora, Minn.

Application August 6, 1948, Serial No. 42,910

2 Claims. (Cl. 43—42.49)

This invention relates to novel and useful improvements in fishing implements.

An object of this invention is to attract fish by means of an improved lure which includes a plate having a bend extending transversely thereacross, with means for attachment of hooks adjacent said bend and on the sides of the said plate, and means at the end of said plate supporting spinners and a hook at the end of the spinners.

Another object of this invention is to attach a fish line through the medium of a line-holding mechanism which is attached to a guide, one end of the guide being attached to the top surface of said plate behind the said bend, whereby the line-holding mechanism may be slid to the rear of the fish lure and to the top of the said plate, while the lure is descending or ascending, and while the line is being towed through the water.

Another object of this invention is to provide an extremely simplified device of the character to be described which lends itself well to commercial manufacture and which serves its intended purpose efficaciously.

Ancillary objects and features of novelty will become apparent to those skilled in the art, in following the description of the preferred form of the invention, illustrated in the accompanying drawings, wherein:

Figure 1 is a perspective view of the preferred form of the invention;

Figure 2 is a sectional view taken on the line 2—2 of Figure 1 and in the direction of the arrows;

Figure 3 is a perspective view of one of the spinners; and,

Figure 4 is a longitudinal sectional view taken on the plane of section line 4—4 of Figure 1.

This invention has been developed in order to provide a device which attracts fish in a novel manner by means of a novel structure.

By means of an assemblage of elements, a device results which performs unbelievable gyrations and fish-attracting movements in the water while it is being used in its intended purpose. This mechanism and structure includes a disk or plate 10 which has a bend 12 extending substantially transversely thereof and substantially in the center. It is noted that the bend forms sections of the said disk or plate 10 which are at an internal angle of 175° or an external angle of 185°

Rings 14 and 16, respectively, which are substantially conventional, are attached to the plate 10 at the ends of the bend 12. These rings support conventional fish hooks, seen at 18.

A guide 20, preferably in the form of a rigid or stiff wire, is attached at one end to the upper surface of the said plate 10 and the opposite end has a small, rudder-like member 22 interconnecting the said last-mentioned end and the bottom of the said plate 10. Engaging this guide 20 is a ring 24 which is slidably positioned thereon in order that it may be positioned selectively at the forward end of the said guide 20, as shown in phantom in Figure 1, or at the rear of the said guide 20 for different operations.

When the lure is descending, the said ring 24 is in one position, and while it is being towed or raised, the said guide automatically (due to the hydrodynamic forces) is at another position.

The said ring 24 has a safety pin like attachment member 26 which connects with an antitwist line attaching mechanism conventional in nature and seen at 28.

The opposite end of the said plate 10 has a wire loop 30 secured thereto by means of an aperture formed in the said plate 10. This loop 30 is of the key-ring type in order that a shaft 32 may easily be attached thereto by means of an eye 34 formed at the end thereof. It is noted at this point that the aperture receiving the said loop 30 is in substantial alignment with the ends of the said guide 20.

The said shaft 32 has a second eye 36 at the opposite end thereof, accommodating a loop 38 identical to the said loop 30. A fish hook of any description 40 may be attached to the said loop 38 for the usual purpose.

A number of spinners are rotatably received on the said shaft 32. Each spinner is different in external configuration. Common to each spinner, however, are the brackets 42 positioned in alignment on each plate-like spinner. One of the spinners is seen in Figure 3 and includes a body 44 having the aligned brackets 42 with apertures therein. The ends of the said body 44 are fin-like members 46 and 48 which are arcuate in configuration.

Interposed between the said spinner body 44 and the next adjacent spinner body seen at 50 and at 52 are a number of washers 54 for the purpose of spacing the spinners the proper amount.

The said spinner 50 differs from the said spinner 44 in that the side edges of the said spinner 50 are flared rearwardly outwardly, while the side edges of the said spinner 44, toward the rear end thereof, are convexed and curved inwardly toward each other at the rear end of the spinner 44.

The said spinner 52 has smoothly curved edges 56 extending only a partial amount of the longitudinal measurement thereof and converging edges 58 continuing the remainder of the length thereof.

Each spinner, however, has oppositely curved ends in order to provide the necessary turning movement in water.

In operation, the bend of the main plate 10 assists in pulling the entire lure downwardly in the water while the spinners are in their normal operation. When a fish is struck, the fishing line attachment means slides on the guide 20 to the position shown in phantom for lifting the entire mechanism out of the water with the fish on one of the hooks.

It is apparent that variations may be made without departing from the spirit of the invention.

Having described the invention, what is claimed as new is:

1. A fish lure comprising a plate having a transverse bend extending from side to side thereof to divide the plate into two sections, said sections being flat, a guide rising from the top surface of said plate and extending in advance thereof, a line attachment mechanism slidably secured to said guide and operable to positions in advance of and above said guide, and means in said plate at the edges thereof and at the ends of said bend for attaching a fish hook thereto.

2. A fish lure comprising a plate having a transverse bend extending completely across said plate, said plate including a pair of flat sections separated by said bend, a guide extending from the top surface of said plate and extending in advance of said plate, a line-attachment mechanism slidably secured to said guide, and fish hook fastening means at the ends of said bend and in said plate, said means including a shaft having a plurality of spinners thereon and a ring connecting a fish hook to one end of said shaft.

AADE PELTO.

REFERENCES CITED

The following references are of record in the file of this patent:

UNITED STATES PATENTS

| Number | Name | Date |
|---|---|---|
| D. 138,088 | Moblo et al. | June 13, 1944 |
| 315,967 | Spencer | Apr. 14, 1885 |
| 418,200 | Loftie | Dec. 31, 1889 |
| 524,494 | Thayer | Aug. 14, 1894 |
| 527,259 | Allen | Oct. 9, 1894 |
| 760,028 | Shulean | May 17, 1904 |
| 1,476,139 | Bingham | Dec. 4, 1923 |
| 1,742,786 | Roberts | Jan. 7, 1930 |
| 1,862,917 | Anderson | June 14, 1932 |
| 1,893,390 | Benzick et al. | Jan. 3, 1933 |
| 2,220,302 | Thorne | Nov. 5, 1940 |
| 2,235,868 | Coolidge et al. | Mar. 25, 1941 |
| 2,238,604 | Sabin | Apr. 15, 1941 |
| 2,463,889 | Lundemo | Mar. 8, 1949 |